F. M. RUSCHHAUPT.
Manufacture of Vinegar.
No. 29,407. Patented July 31, 1860.
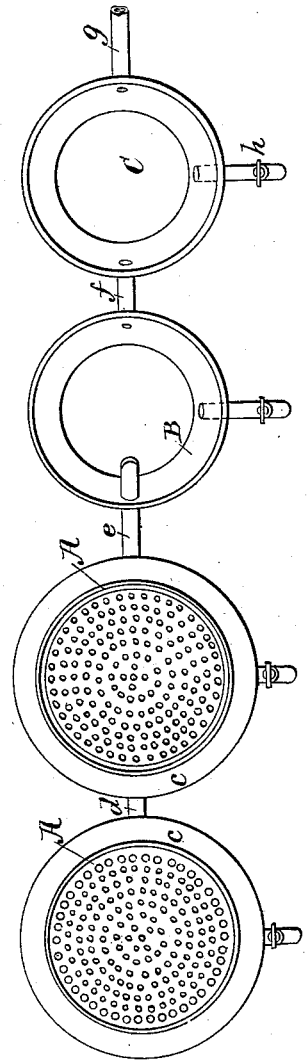
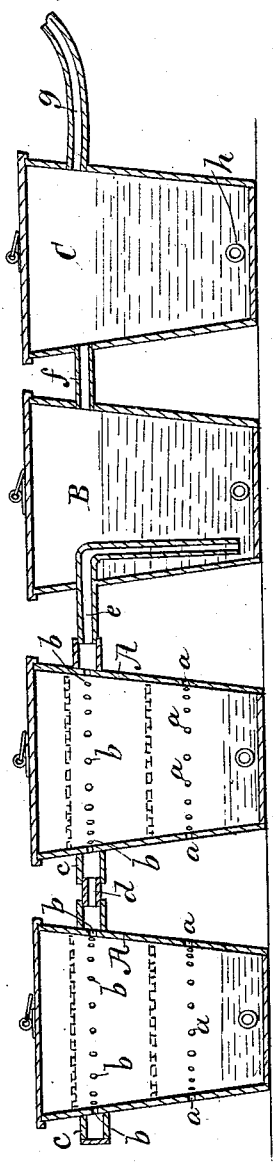

UNITED STATES PATENT OFFICE.

F. M. RUSCHHAUPT, OF NEW YORK, N. Y.

APPARATUS FOR MANUFACTURE OF VINEGAR.

Specification of Letters Patent No. 29,407, dated July 31, 1860.

*To all whom it may concern:*

Be it known that I, F. M. RUSCHHAUPT, of the city, county, and State of New York, have invented certain new and useful Improvements in the Manufacture of Vinegar; and I do hereby declare that the following is a full, clear, and exact description of the same, reference being had to the accompanying drawing, forming a part of this specification, in which—

Figure 1 represents a horizontal section of my invention. Fig. 2 is a longitudinal vertical central section of the same.

Similar letters of reference in both figures indicate corresponding parts.

My invention relates to certain improvements on that class of manufacture of vinegar, in which alcohol by being brought in contact with the oxygen of the atmospheric air, is transformed into hydrous acetic acid or vinegar. A series of tubs or acidifiers are placed into a closed room and these tubs are furnished with two or more bottoms or horizontal partitions at different height from the bottom and perforated with a number of small holes. These partitions are covered with coal or shavings and the alcohol is thus allowed to pass down through the tub slowly and divided into small streams or drops, which by coming in contact with the atmospheric air are oxidized and transformed into hydrous acetic acid. The air is admitted through a series of holes in the lower portion of the acidifiers and the foul air passes off through another series of holes in the upper portion of the acidifiers into the room, in which the acidifiers are placed. The amount of oxygen thus being brought in contact with the alcohol depends entirely upon the state of the atmosphere in the room and upon the force of the current of air passing through the acidifiers. The state of the atmosphere in the room becomes worse and worse as the acidification proceeds and the current of the air can not be controlled and at the same time much of the alcohol is kept in suspension in the air passing through the acidifiers and it is carried out into the room and lost.

To overcome these difficulties is the object of my invention which I will now proceed to describe with reference to the drawing.

A A are the acidifiers of ordinary construction. The air is admitted to them through openings $a$ and it passes off through another series of openings $b$. These last named openings are surrounded by annular passages $c$ and the passages of the several acidifiers connect with each other by means of tubes $d$. The annular passage of the last acidifier in the series connects with a tube $e$ which leads into the interior of a closed vessel B. This vessel is filled with water and it connects by means of a pipe $f$ with another vessel or cask C. The pipe $f$ leads from the upper portion of the vessel B and the tube $e$ is carried down nearly to the bottom of said vessel, so that the air flowing in from the acidifiers through the tube $e$ has to pass through the entire mass of water contained in the vessel B before it is allowed to escape through the pipe $f$. By these means the alcohol which is kept in suspension in the current of air passing through the acidifiers is separated from the air and saved. The cask C, is also filled with water and a pipe $g$, leads from the same out of the room, containing the apparatus to the open atmosphere. A faucet $h$, at the bottom of the cask C, serves to draw off the water, and it will be of advantage to place the cask C up a little higher than the acidifiers and to carry the pipe $g$, upward in order to cause the air which becomes heated in passing through the acidifiers to pass out freely. When the faucet $h$, is opened, the water in the cask C diminishes and the air is caused to flow in with more or less rapidity according to the rapidity with which the water flows out. A current of air will thereby be effected which passes in through the openings $a$, in the lower portion of the acidifiers, out through the openings $b$ into the passages $c$ and through the tube $e$ into the vessel B and from thence through the pipe $f$, cask C and pipe $g$, to the external atmosphere. The force of this current can be regulated by opening the faucet $h$ more or less, and as the foul air is passed off into the external atmosphere, the original purity of the atmosphere in the room is preserved.

I am aware that force pumps driven by steam engines or other power have been employed to force the air through the acidifiers which allows to a certain extent to control the current; but this method requires a cumbersome and expensive machinery, whereas by drawing the air through in the manner above described, nothing is needed but a simple cask and the necessary passages and tubes and the current of air can be controlled to perfection; it can be stopped and started at pleasure, and it can easily be operated without expense and by persons entirely unacquainted with machinery.

The effect of my arrangement is such that I can produce vinegar in less time than by the methods heretofore employed and the vinegar thus produced is better than ordinary vinegar, because the amount of oxygen, brought in contact with the alcohol can be perfectly regulated. And at the same time by saving that portion of the alcohol, or products from the alcohol which are usually carried off by the air passing from the acidifiers and lost, I can produce the vinegar at less expense than other manufacturers, so that I am enabled to sell a better article at a smaller price.

What I claim as new, and desire to secure by Letters Patent, is—

The arrangement of the annular passages c, tube e, vessel B, pipe f, cask C, and tube g, in combination with the acidifiers A, constructed and operating substantially in the manner and for the manner set forth.

FR. M. RUSCHHAUPT.

Witnesses:
M. M. LIVINGSTON,
B. GIROUX.